US006927797B2

(12) United States Patent
Gelbard (10) Patent No.: US 6,927,797 B2
(45) Date of Patent: Aug. 9, 2005

(54) VIEWFINDER FOR HIGH DEFINITION VIDEO CAMERA

(75) Inventor: Richard Gelbard, Woodland Hills, CA (US)

(73) Assignee: Panavision Inc., Woodland Hills, CA (US)

( * ) Notice: Subject to any disclaimer, the term of this patent is extended or adjusted under 35 U.S.C. 154(b) by 827 days.

(21) Appl. No.: 09/838,060

(22) Filed: Apr. 19, 2001

(65) Prior Publication Data

US 2002/0154237 A1 Oct. 24, 2002

(51) Int. Cl.$^7$ .......................... H04N 5/222; G03B 13/02
(52) U.S. Cl. ........................... 348/333.07; 348/333.06; 348/333.01; 396/148; 396/296; 396/373; 396/374; 396/378; 396/383; 396/535; 352/142; 352/171
(58) Field of Search ...................... 348/333.01, 333.06, 348/333.07; 396/373, 374, 378, 381, 383, 382, 384, 385, 386, 348, 349, 350, 535, 537, 148, 149, 296; 352/142, 171

(56) References Cited

U.S. PATENT DOCUMENTS

| | | | | |
|---|---|---|---|---|
| 3,845,238 A | * | 10/1974 | Schneider et al. | .......... 348/722 |
| 4,017,168 A | * | 4/1977 | Brown | ........................ 352/243 |
| 4,550,343 A | * | 10/1985 | Nakatani | .................... 348/375 |
| 4,557,572 A | * | 12/1985 | Schickedanz | ............... 396/374 |
| 4,682,240 A | * | 7/1987 | Bachmann | ............. 348/333.06 |
| 4,959,729 A | * | 9/1990 | Fukuda et al. | .............. 348/375 |
| 4,963,987 A | * | 10/1990 | Ichiyoshi et al. | ........... 348/375 |
| 5,300,976 A | * | 4/1994 | Lim et al. | .................... 396/374 |
| 5,321,456 A | * | 6/1994 | Yoon | ........................... 396/383 |
| 5,696,555 A | * | 12/1997 | Kashimura | .................. 348/316 |
| 5,767,906 A | * | 6/1998 | Toyofuku et al. | ........... 348/375 |
| 5,893,649 A | * | 4/1999 | Shimada | ..................... 396/383 |
| 5,920,426 A | * | 7/1999 | Neil | ........................... 359/428 |
| 6,480,681 B1 | * | 11/2002 | Neil | ........................... 396/373 |
| 6,778,775 B1 | * | 8/2004 | Auffret | ....................... 396/374 |

FOREIGN PATENT DOCUMENTS

| | | | | | |
|---|---|---|---|---|---|
| DE | 3525526 C | * | 2/1987 | .......... | G03B/13/06 |
| DE | 4302173 A | * | 7/1994 | .......... | G03B/19/20 |
| JP | 61059974 A | * | 3/1986 | .......... | H04N/5/225 |
| JP | 01023239 A | * | 1/1989 | .......... | G03B/13/02 |
| JP | 02050679 A | * | 2/1990 | .......... | H04N/5/225 |
| JP | 02262772 A | * | 10/1990 | .......... | H04N/5/225 |
| JP | 05145808 A | * | 6/1993 | .......... | H04N/5/225 |
| JP | 06022184 A | * | 1/1994 | .......... | H04N/5/225 |
| JP | 06233160 A | * | 8/1994 | .......... | H04N/5/225 |

OTHER PUBLICATIONS

Literature from OpTex entitled "Electronic Extension Viewfinder For Sony ENG Cameras", dated Nov. 1990.

* cited by examiner

*Primary Examiner*—Tuan Ho
*Assistant Examiner*—Brian Genco
(74) *Attorney, Agent, or Firm*—Morrison & Foerster LLP (57) ABSTRACT

A viewfinder for mounting on a camera having a video signal tap, such as a professional video camera, to extend forwardly and laterally of the camera. A pivotable member is connected to a support base for selectively pivoting about a laterally extending axis and being selectively locked in any angular position. A viewing module is releasably connected to the pivotable member to extend rearwardly along the side of the camera and has a CRT facing rearwardly with an eyepiece for viewing the CRT. The viewing module has controls for the CRT on an outwardly facing surface for manually adjusting the controls. Cooperating and releasable electrical connectors are provided between the pivot member and the viewing module for transmitting video signals and electrical power therebetween. An extension member, either of a fixed length or telescoping, may be installed between the pivot member and the viewing module and has the same electrical connectors.

33 Claims, 9 Drawing Sheets

VIEWFINDER FOR HIGH DEFINITION VIDEO CAMERA

The present invention relates to the construction of a viewfinder for a camera having a video signal tap and, in particular, a viewfinder that has an increased versatility and usability for operating on a high definition (HD) video camera in both portable and stationary modes.

Professional video cameras for electronic news gathering (ENG), for electronic field production (EFP) and for studio use heretofore have used a relatively compact viewfinder having plastic components for minimizing the weight for shoulder supported use of the HD video camera, even though the video camera often is used on a tripod, a dolly, a crane or other camera support where minimizing weight is not an important factor. Further, the desirable position for the cameraman's face with respect to the HD video camera is substantially different when the camera is positioned on the cameraman's shoulder compared to when the camera is supported by a tripod or the like, and therefore the conventional viewfinder is usually provided with an optical extension with additional optical elements to move the viewing position rearwardly when the HD video camera is supported on a tripod or the like. The additional weight and length of the viewfinder optical extension is excessive for the conventional pivotable support mechanism of the conventional viewfinder that was designed without anticipating the use of the optical extension device, whereby it is difficult to maintain the angular position of the viewfinder relative to the camera.

The support for a conventional viewfinder on a HD video camera has very limited adjustments laterally and longitudinally of the camera because the design criteria for use of the camera on the cameraman's shoulder does not require a significant amount of adjustment in those directions with the camera positioned on the shoulder. However, again when the HD video camera is supported on a tripod or the like the cameraman may be seated, standing or changing positions whereby it is desirable to have a large degree of lateral and longitudinal adjustment of the position of the viewfinder that was not necessary for shoulder-supported use of the camera.

The conventional viewfinder for a HD video camera uses a small cathode ray tube (CRT) positioned to extend laterally from near the support of the viewfinder on the camera with a mirror positioned at a 45° angle to reflect the picture rearwardly for viewing by the cameraman through an eyepiece. When an extension is used on the conventional viewfinder, the eyepiece must be changed and yet the quality of the viewed picture is reduced because of the increased distance from the CRT. Further, the controls for the CRT in the conventional viewfinder are on the front, which is relatively convenient for shoulder-supported use of the HD video camera but become inconvenient when an extension is used or the camera is supported on a tripod or the like.

Therefore, it is a principle object of the present invention to provide a novel viewfinder for a camera having a video signal tap that solves the aforementioned and other problems and shortcomings of the conventional viewfinder. Specifically, it is an object of this invention to provide such a camera viewfinder in which a viewing module comprises a CRT portion directly connected to an eyepiece, which are repositioned together as a unit, with or without a structural, non-optical extension, for lengthening or shortening the viewfinder, whereby the CRT picture viewed by the cameraman always remains optimal and the same. Another object of this invention is to provide a video camera viewfinder with modular extensions of different lengths or adjustable in length without requiring modification of the optical system for viewing the CRT. Still another object is to provide such a viewing module that includes all of the controls for the CRT and in a convenient location. A further object of this invention is to provide a video camera viewfinder having substantial distances of lateral and longitudinal adjustment of the viewfinder relative to the video camera. A still further object of this invention is to provide a video camera viewfinder with a pivotable joint for allowing substantial angular movement between the viewfinder and the camera in a longitudinal plane and a locking mechanism for readily and reliably locking the viewfinder in any selected angular position. Still another object of this invention to provide a video camera viewfinder with the CRT facing rearwardly in the viewfinder for direct viewing rather than indirect viewing by a mirror. An additional object of this invention is to provide the controls for the CRT of the viewfinder on a lateral side of the CRT module that is convenient to the cameraman and remains the same distance and location relative to the eyepiece regardless of the use of any extensions.

Other and more detailed objects and advantages of the present invention will appear to those skilled in the art from the following description of a preferred embodiment of the invention in connection with the accompanying drawings wherein:

Figure 1:
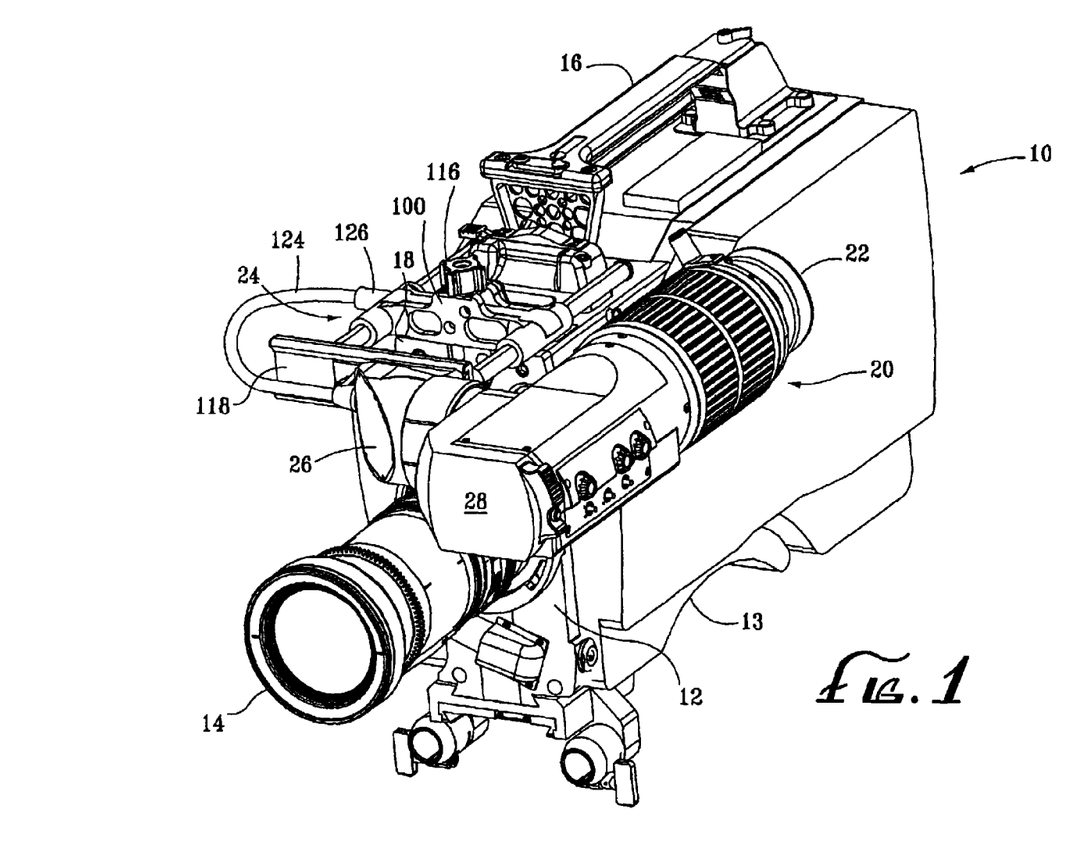
FIG. 1 is a perspective view of a conventional HD video camera with the viewfinder of the present invention mounted thereon.

Referring now to FIG. 1, a conventional professional HD video camera 10, such as a Sony HDWF-900 model, is shown for illustrating how the present invention is used for replacing the conventional viewfinder (not shown) on a professional video camera but it will be readily understood by those skilled in the art that the present invention is equally applicable to other types and models of professional video cameras and to professional film cameras that include a video signal tap that may be used for the viewfinder of the present invention. The camera 10 has a front portion 12 on which a lens 14 is mounted, and lens 14 may be of any type and replaceable for using any desired lens. The camera 10 has a handle 16 on the top and a top front portion 18 on which the conventional viewfinder (not shown) normally is mounted but in FIG. 1 has been replaced by the viewfinder 20 of the present invention. The conventional viewfinder extends laterally from the center of the front portion 18 of the camera and then rearwardly, similar to illustrated viewfinder 20, to a location that may be viewed by the camera operator when the shoulder pad 13 of the camera 10 is resting on the shoulder of the camera operator. At this point it should be noted that when the camera 10 is mounted on a tripod or the like, rather than being carried on the shoulder of the cameraman, the eyepiece of the conventional viewfinder is in an awkward position immediately adjacent the side of the camera 10 and therefore it has become common practice to add optical extensions to the viewfinder to extend the viewing location to the rear of the camera for convenience. While the conventional viewfinder includes a swivel to allow pivoting of the viewfinder about a horizontal lateral axis, it has been found that it is difficult to maintain the pivoted position of the conventional viewfinder when an optical extension is added because of the additional weight and moment about the pivotal axis at the front of the viewfinder. These and other problems with and deficiencies of the conventional viewfinder, as noted above, are overcome by the viewfinder of the present invention.

Figure 2:
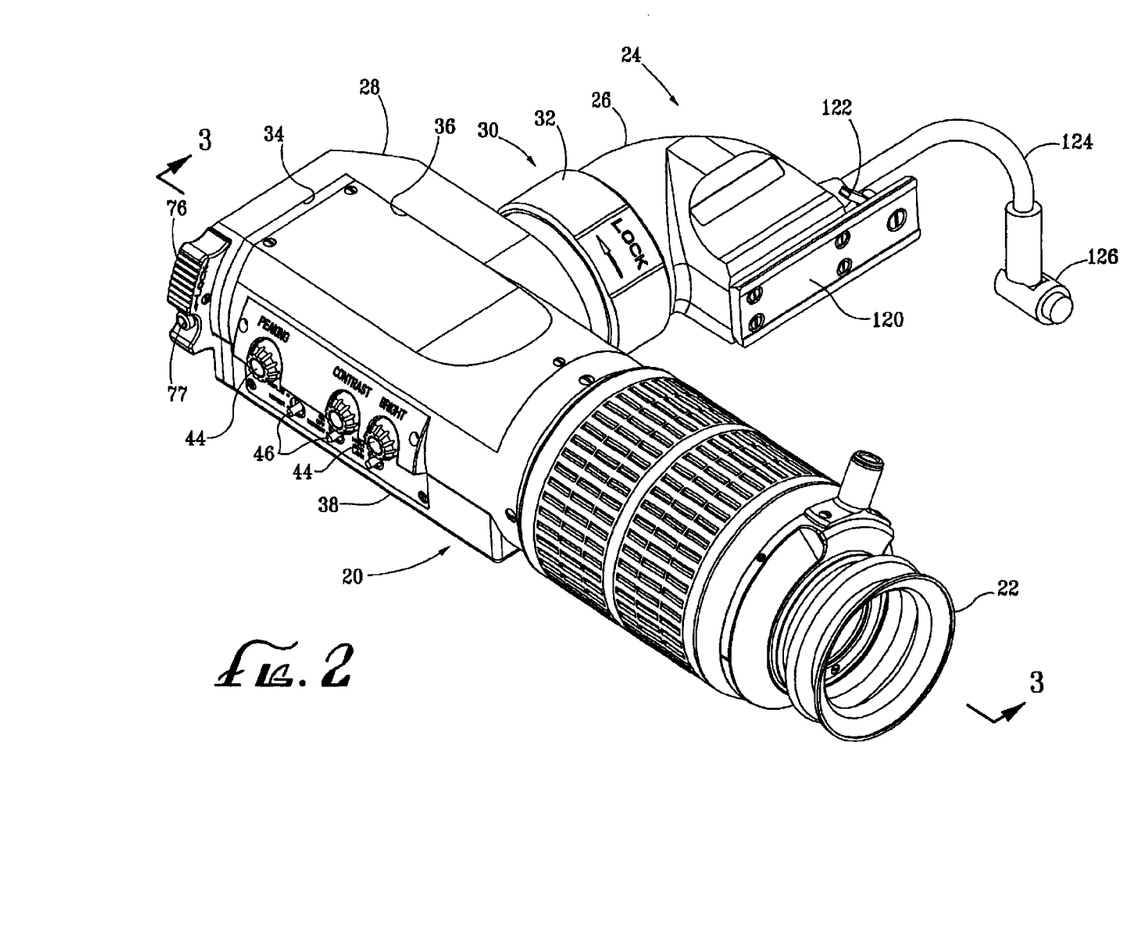
FIG. 2 is a perspective view of the video camera viewfinder of the present invention separate from the video camera.
Figure 3:
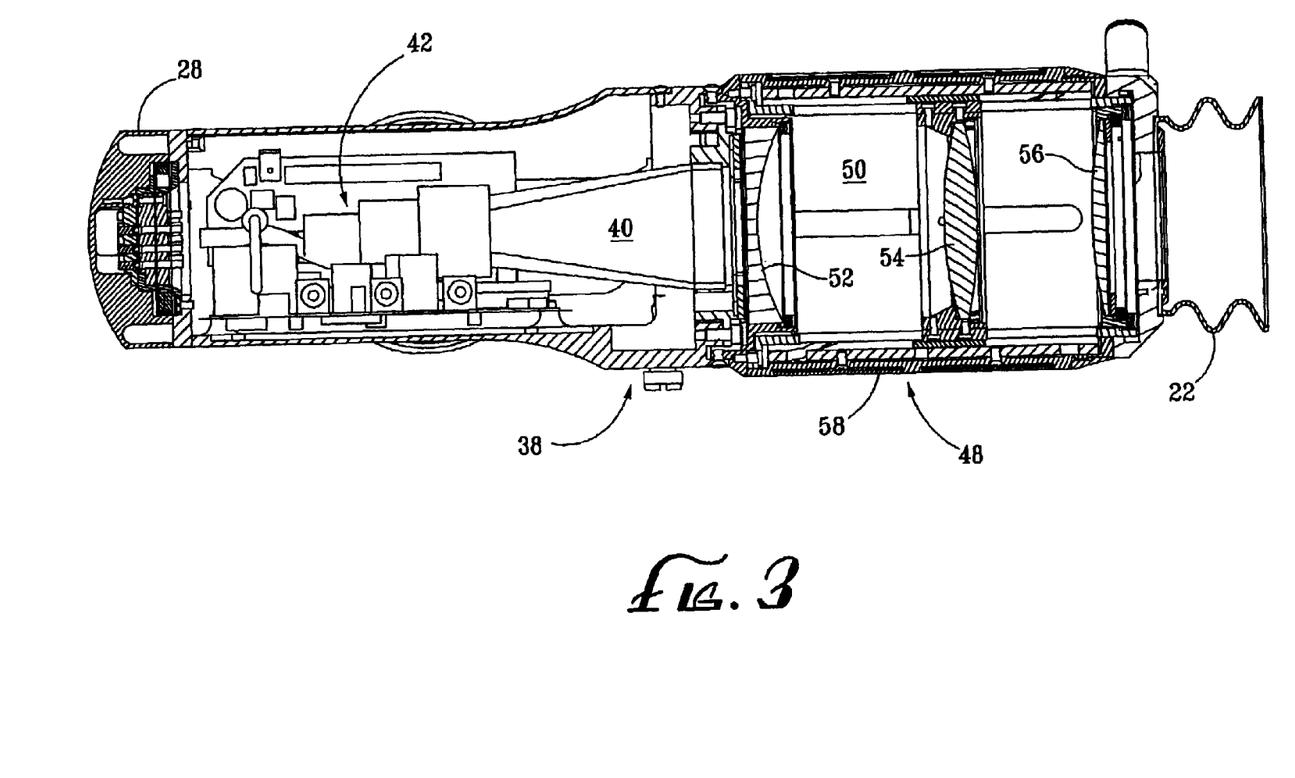
FIG. 3 is a sectional elevation view of the video camera viewfinder of the present invention taken substantially on the line 3—3 shown in FIG. 2.

Referring also to FIGS. 2 and 3, the viewfinder 20 of the present invention is illustrated in the configuration for using the camera 10 on the shoulder of the cameraman with the eye cup 22 in the proper fore and aft location for the eye of the cameraman. A support base assembly 24 of the viewfinder 20 is adapted to be mounted on the top front portion 18 of the camera 10 in a manner that allows substantial fore and aft adjustments and lateral adjustments of the viewfinder 20 that will be described below in detail. An elbow or knuckle 26 portion of the support base assembly 24 extends forwardly and then laterally to a pivotal connection with a pivot member 28 that allows pivoting of the viewfinder 20 about a laterally extending horizontal axis. A pivot locking mechanism 30 is provided on knuckle 26 and pivot member 28 that permits locking and unlocking of the pivoted orientation between the knuckle 26 and pivot member 28 by merely rotating an external locking ring 32. This allows the eye cup 22 to be positioned at the most convenient vertical location for the cameraman.

The pivot member 28 has an L-shaped socket comprised of a vertical base 34 and a vertical side 36 to which a viewing module 38 is removably connected in a manner that will be described below more fully. The viewing module 38 includes a cathode ray tube (CRT) 40 that faces rearwardly within the tubular viewing module 38, which also includes all of the conventional operating and control components 42 for the CRT 40. Control knobs 44 and control buttons 46 are provided on the side of the viewing module 38 for controlling such features as peaking, contrast, brightness, display aspect, on and off, and the like. The knobs 44 and buttons 46 are in a convenient location for the cameraman to both see and reach, and their location does not change relative to the cameraman's head when positioned adjacent the eye cup 22 when an extension member is added, in contrast to the location of the controls on the front of a conventional viewfinder.

The viewing module 38 includes an eyepiece portion 48 between the CRT 40 and the flexible eye cup 22. The precise construction of the eyepiece 48 and its optical characteristics are disclosed in a commonly assigned, concurrently filed patent application by another inventor and, therefore, the eyepiece 48 will only be described in general terms adequate for understanding the present invention. The eyepiece 48 is provided with an optical lens system 50 comprised of a negative lens 52 adjacent the CRT 40, a positive lens 54 in the middle, and a second positive lens 56 adjacent the eye cup 22. The middle positive lens 54 is longitudinally adjustable by rotating the outer ring 58 of the eyepiece 48 to move lens 54 between a front position close to lens 52 and a rear position close to lens 56 for adjusting the focus of the eyepiece 48 on the screen of the CRT 40. In this manner, the optical lens system 50 of the eyepiece 48 is adjustable for accommodating the particular eye of the cameraman, that is, to accommodate for near and far sightedness (myopia and hypermetropia, respectively) over a wide range to provide a sharp image of the CRT screen. Since the only movable lens element in the optical lens system 50 of the eyepiece 48 is the middle lens 54, the length of the eyepiece 48 does not change and therefore the position of the eye cup 22 relative to the entire viewing module 38 does not change, which provides increased comfort for the cameraman. Since the CRT 40 is in line with and directly in front of the optical axis of the optical lens system 50 of eyepiece 48, the viewing of the CRT 40 is direct and does not require a mirror or any other optical components as required in the conventional viewfinder.

Figure 4:
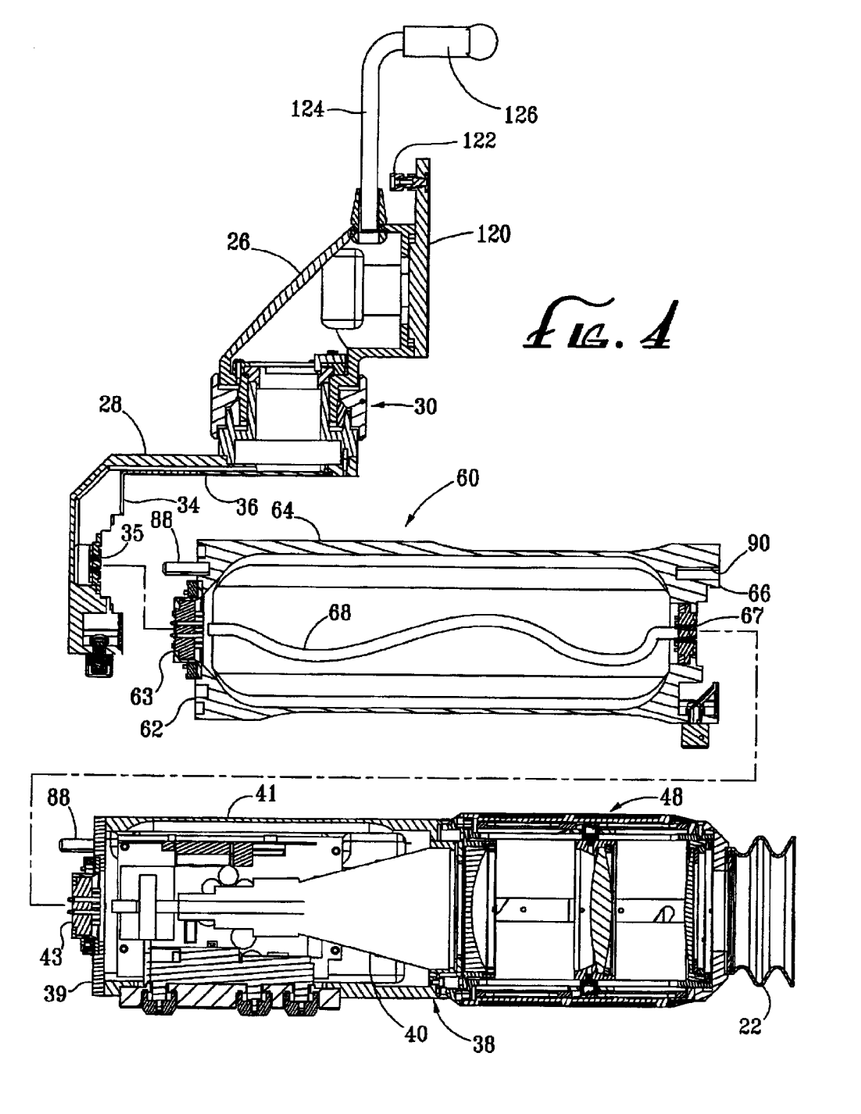
FIG. 4 is a sectional plan view of the video camera viewfinder of the present invention with an extension member and the other components separated for showing the manner in which the components are assembled.

Referring now to FIG. 4, which is a horizontal sectional view schematically showing the support base knuckle 26, the pivot member 28 and the viewing module 38 with an extension member 60 illustrated as being mountable between the pivot member 28 and the viewing module 38, as shown by the dot-dash centerline between those components. In other words, the extension member 60 is a rigid tubular member having a front end 62 adapted to fit onto the vertical base 34 of the pivot member 28 and a vertical side surface 64 for slidably engaging the vertical side 36 of the pivot member 28. The extension member 60 has a rear end 66 adapted to fit onto the front end 21 of the viewing module 38 when the viewing module 38 is removed from the pivot member 28. As briefly described with respect to FIGS. 1, 2 and 3, without the extension member 60 the front end 39 of the viewing module 38 is joined to the vertical base 34 of the pivot member 28 and the vertical side 41 of the viewing module 38 slidably engages the vertical side 36 of the pivot member 28. The extension member 60 may be of any desired length for accommodating the various uses of the viewfinder 20 on camera 10 and, in fact, plural extensions 60 of different lengths may be provided for changing the overall length of the viewfinder 20 to meet different requirements from time-to-time. It should be noted that the addition of the extension member 60 between the pivot member 28 and the viewing module 38 does not modify the image viewed by the cameraman from the eye cup 22 through the eyepiece 48 because the CRT 40 remains in exactly the same position for viewing.

As shown in FIG. 4, the extension 60 has an electrical plug or connector 63 on the front end 62 and an electrical socket or connector 67 on the rear end 66. As will become more apparent from the description below of the details illustrated in FIGS. 5A, 5B and 5C, the electrical connector 67 on the extension member 60 mates with and is releasably connected to an electrical plug or connector 43 on the front end 39 of the viewing module 38 and the electrical socket or connector 63 on the front end 62 of extension member 60 mates with an electrical connector 35 on the vertical base 34 of pivot member 28. The electrical connector 63 on the front of extension member 60 is identical to the electrical connection 43 on the front of viewing module 38 and the electrical connector 35 on the pivot member 28 is identical to the electrical connector 67 on the rear end 66 of extension 60, whereby the viewfinder 20 can be assembled with or without the extension 60 without modifying the electrical connectors between the components. An electrical cable 68 extends internally of the extension member 60 from one end to the other and connects the electrical connector 63 on the front end 62 to the electrical connector 67 on the rear end 66.

Figure 5A:
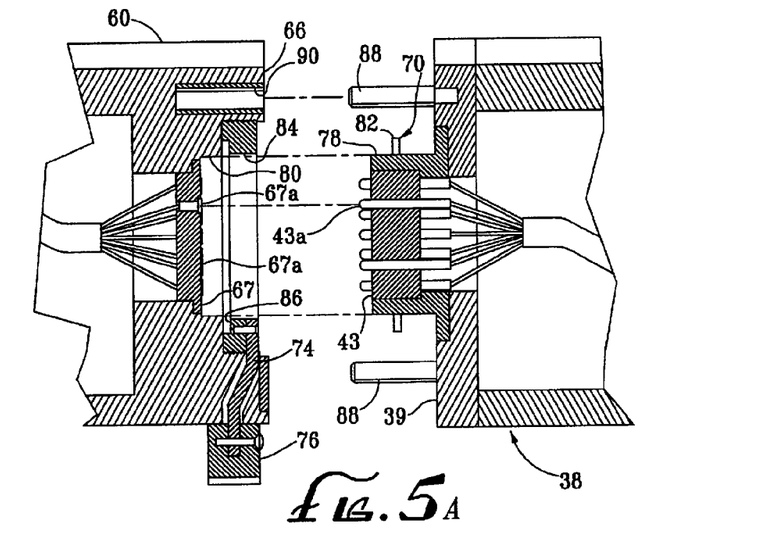
FIG. 5A is an enlarged, fragmentary sectional view (taken on the lines 5—5 in FIGS. 5B and 5C) of the connecting ends of two of the viewfinder components slightly separated from their connected condition.
Figures 5B, 5C:
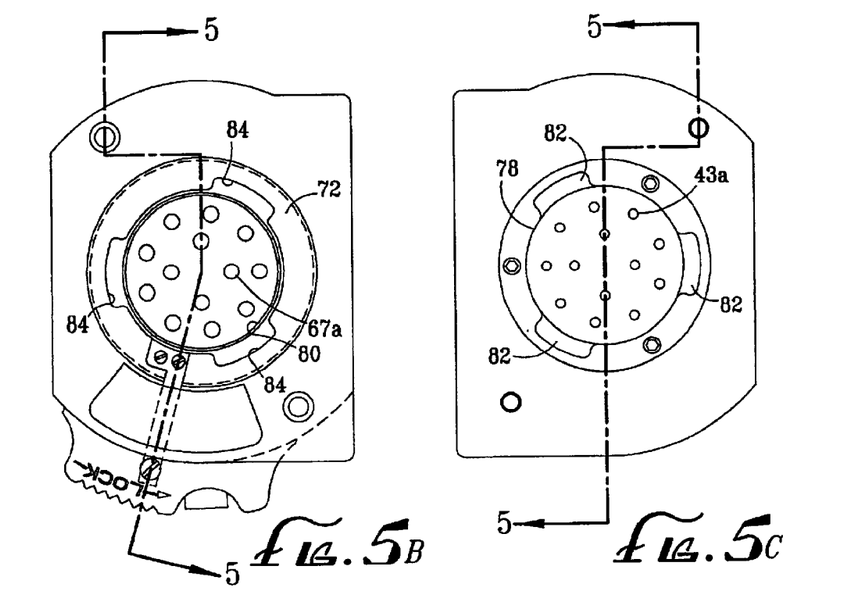
FIGS. 5B and 5C are the end views of those female and male, respectively, connecting ends.
Figure 6:
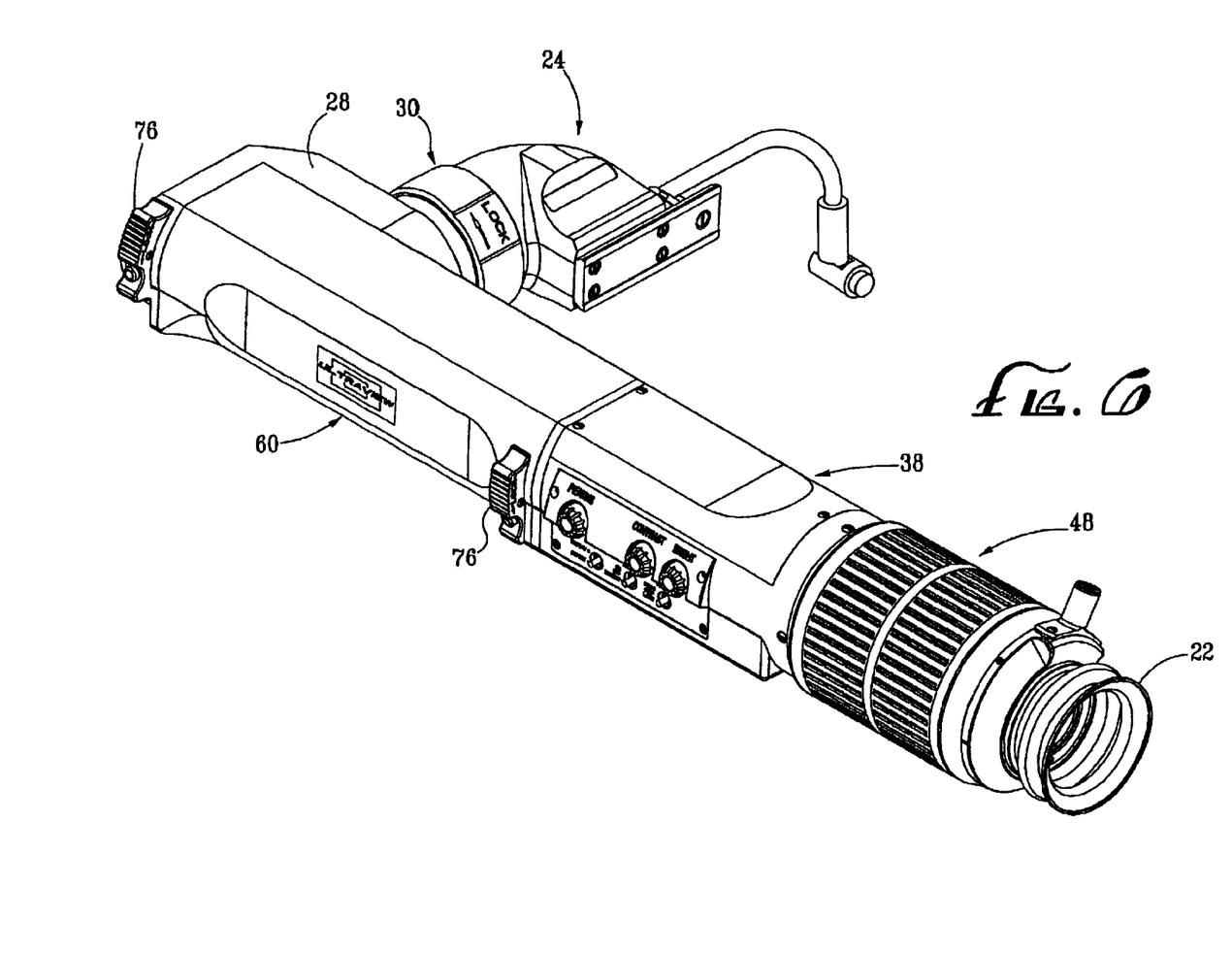
FIG. 6 is a perspective view of the video camera viewfinder of the present invention with the extension illustrated in FIG. 4 and the other components in an assembled condition.
Figure 7:
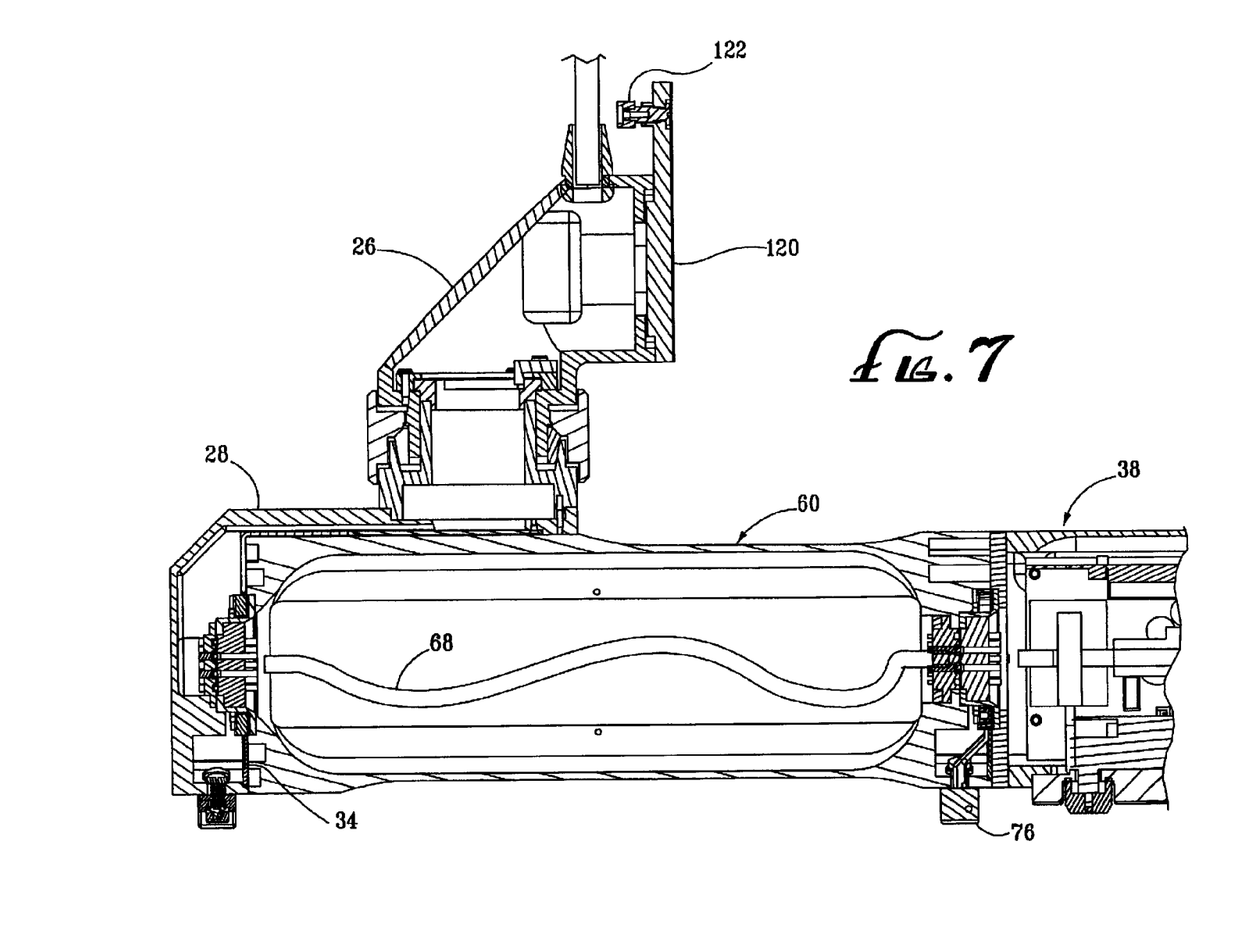
FIG. 7 is a sectional plan view of the extension portion and connected components of the video camera viewfinder of the present invention.

Referring now to FIGS. 5A, 5B and 5C, the physical and electrical connections between the front end 39 of the viewing module 38 and the rear end 66 of the extension member 60 are shown in greater detail. This same connection exists between the front end 62 of extension member 60 and the vertical base 34 of the pivot member 28 and between the front end 39 of the viewing module 38 and the vertical base 34 of the pivot member 28 when the extension member 60 is not used. The electrical connector 43 is provided with a plurality of contact pins 43a (thirteen of which are shown in this example, although any number may be used) that are spring loaded and in a pattern to match and engage a like plurality of electrical contacts 67a of electrical connector 67 in a conventional manner. A male bayonet connector 70 is mounted on the front end 39 of the viewing module 38 and supports the electrical connector 43. A female bayonet lock 72 is rotatably mounted on the rear end 66 of the extension member 60 and is provided with a lever 74 and a thumb knob 76 for selectively rotating the bayonet lock 72. The bayonet connector 70 has a cylindrical end portion 78 that fits into a cylindrical bore 80 in the end 66 of the extension member 60. The connector 70 has three circumferentially extending and spaced flanges 82 that fit through three circumferentially extending and spaced openings 84 in the bayonet lock 72 when inserted in a longitudinal direction, whereby each contact pin 43a of electrical connector 43 engages electrical contacts 67a of electrical connector 67 without any rotary movement between the electrical connectors. The bayonet lock 72 is then rotated by lever 74 and knob 76 to capture the flanges 82 in the circumferential recess 86 on the back of the bayonet lock 72 to thereby lock the viewing module 38 to the extension member 60. A safety lock button 77 (see FIG. 2) must be depressed to unlock and rotate the bayonet lock 72. A pair of guide pins 88 that are spaced 180° apart are provided on the front end 39 of the viewing module 38 to engage a mating pair of guide bushings 90 installed in the rear end 66 of the extension member 60 to prevent rotation between the viewing module 38 and extension member 60. Thus, the viewing module 38 and extension member 60 may be readily connected and disconnected, and a very rigid connection is established for supporting one member from the other. The complete assembly of the viewfinder 20 with the extension member 60 is shown in FIG. 6. The completed connection between the viewing module 38 and the extension member 60 is shown in section in FIG. 7 and the identical connection between the front end of extension member 60 and the vertical base 34 of the pivot member 28 is also shown.

Figure 8:
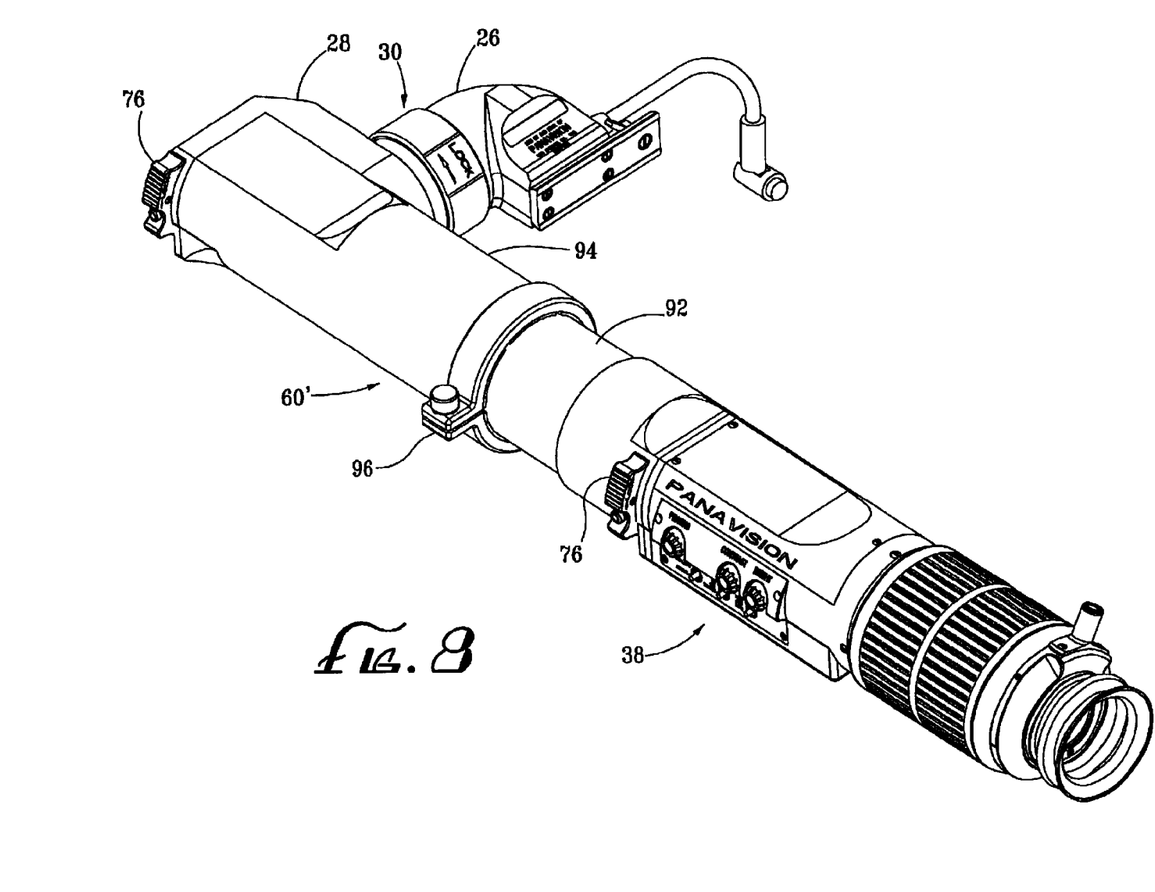
FIG. 8 is a perspective view of the video camera viewfinder of the present invention similar to FIG. 6 but illustrating an adjustable extension member.

Referring now to FIG. 8, an adjustable extension member 60' is shown and mounted between the viewing module 38 and the pivot member 28 in the same manner as the mounting connections used with the extension member 60 of a fixed length. The adjustable extension member 60' is comprised of an inner tubular member 92 that slidably fits within an outer tubular member 94 on which is provided a clamp 96 for fixedly connecting the two tubular members 92 and 94 in any desired position. An electrical cable (not shown) similar to previously described electrical cable 68 extends from the front end of tubular member 94 to the rear end of tubular member 92 for connecting the electrical connectors (not shown) on those respective ends, similar to electrical connectors 63 and 67 of extension member 60. The tubular members 92 and 94 may be of any desired length for providing the minimum and maximum extensions desired such as, for example, very short tubular members that would allow an adjustment of as little as a three inch length to a five inch length or longer tubular members that would allow an adjustment from an eight inch length to a twelve inch length. In each such embodiment the portion of the inner tubular member 92 that extends into the outer tubular member 94, that is, the overlap of the two members in the maximum extended length must be adequate to provide the structural support between the two sliding tubular members. Of course, the electrical cable also must be of an adequate length to accommodate the extension to the maximum length and can be of any conventional type, such as a coiled cable that would resiliently accommodate the extensions and retractions.

Figure 9:
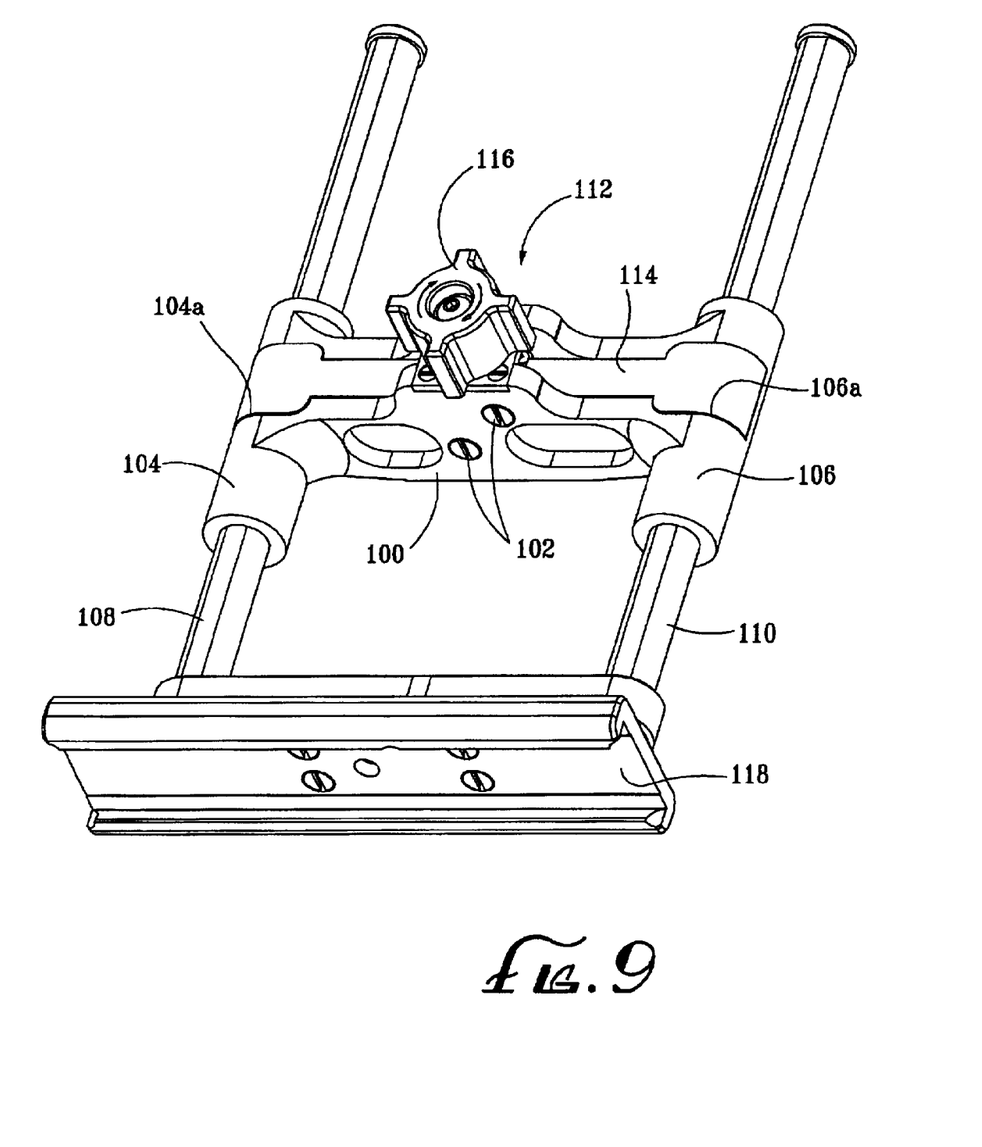
FIG. 9 is a perspective view of a portion of the support base of the video camera viewfinder of the present invention and illustrating the elements for providing substantial longitudinal and lateral adjustments of the position of the viewfinder.

Referring now to FIGS. 1 and 9, the support base assembly 24 includes a rod support base 100 which is attached to the top front portion 18 of the video camera 10 such as by a pair of machine screws 102. The rod support base 100 has a pair of parallel sleeves 104 and 106 with bores therethrough for receiving a pair of rods 108 and 110 that extend longitudinally and over the top of the video camera 10. A rod locking mechanism 112 is provided on the rod support base 100 and includes a bridge member 114 that extends in a lateral direction over the top of the pair of sleeves 104 and 106 into openings 104a and 106a in the sleeves. A locking screw with a knob 116 is threaded through the rod support base 100 and engages the bridge 114 to selectively raise and lower the bridge 114 to cause the ends of the bridge to selectively release and lock the rods 108 and 110 in the sleeves 104 and 106, respectively, thereby allowing fore and aft adjustment of the rods 108 and 110 for a substantial distance. The front of the rods 108 and 110 are connected to a dovetail slot member 118 that extends longitudinally and supports a mating dovetail slot member 120 on the knuckle 26 (see FIG. 2) to allow lateral adjustment of the viewfinder 20 relative to the camera 10 for a substantial distance by reason of the substantial lengths of the dovetail members 118 and 120. A locking screw 122 is provided on dovetail member 120 to selectively lock the dovetail members 118 and 120 together at any desired lateral position. An electrical cable 124 with a plug 126 for connecting to the side of the camera 10 (see FIG. 1) extends from the end of the knuckle 26. The wires (not shown) from cable 124 extend through the knuckle 26, the locking mechanism 30 and pivot member 28 to the electrical connector 35 in the base of the pivot member 28 to thereby connect the electronics from the camera 10 to the CRT control means 42 in the viewing module 38.

In operation the viewfinder 20 of this invention is mounted on the camera 10 by the support base assembly 24 and is longitudinally adjustable for the full length of the pair of rods 108, 110 and laterally adjustable for the full length of the pair of dovetail members 118, 120 for selectively locating the viewfinder 20 in the most desirable position for the cameraman and/or the type of use that is being made of the video camera from time-to-time. Still further, by loosening and locking the pivot locking mechanism 30, the angular position of the viewfinder 20 relative to the camera 10 may be adjusted. Further, the longitudinal length of the viewfinder 20 may be changed for the particular use by inserting an extension member 60 of a desired length or by inserting a telescoping extension member 60' and appropriately adjusting its length. Thus, it may be seen that by this invention a universally adjustable viewfinder 20 is provided that can comfortably accommodate any proposed use of the video camera 10 and yet the image displayed on the CRT 40 that is viewed from the eye cup 22 through the eyepiece 48 is not changed by any of the adjustments or extension members, although the focus on the CRT 40 is adjustable over a wide range to accommodate the eye sight of the cameraman. While the viewfinder 20 of this invention has been described in detail and in connection with its use on a specific video camera for a complete disclosure of a preferred embodiment of the invention, it will readily appear to those skilled in the art that numerous variations and modifications may be employed without departing from the scope of this invention as defined by the accompanying claims.

The claimed invention is:

1. A viewfinder for mounting on a camera having a video signal tap, comprising:
   a support base assembly for mounting on the camera to extend forwardly and laterally of the camera;
   a pivot member pivotally connected to said support base assembly for selectively pivoting about a laterally extending axis, said pivot member having electrical wires from a connection to the video signal tap of the camera for transmitting video signals from the camera;
   a pivot locking mechanism on said support base assembly and pivot member for selectively locking said pivot member to said support base assembly to prevent pivoting therebetween;
   a viewing module releasably connected to said pivot member for extending rearwardly along a side of the camera, said viewing module having a CRT facing rearwardly and an eyepiece extending rearwardly for viewing said CRT; and
   cooperating and-releasable electrical connectors on said pivot member and said viewing module for transmitting video signals from said pivot member to said viewing module.

2. The viewfinder of claim 1, wherein said viewing module includes CRT controls on an outer surface for manually controlling the CRT.

3. The viewfinder of claim 1, further comprising an extension member releasably connected between said pivot member and said viewing module, said extension member having cooperating and releasable electrical connectors on each end releasably connected to said electrical connectors on said pivot member and said viewing module, respectively, and an electrical cable extending through said extension member and electrically connected to said electrical connectors on each end.

4. The viewfinder of claim 3, wherein said extension member comprises a rigid member of a fixed length.

5. The viewfinder of claim 3, wherein said extension member is a closed tubular member for enclosing said electrical connectors and cable.

6. The viewfinder of claim 3, wherein said extension member is comprised of telescoping tubular members with a locking mechanism between said telescoping tubular members.

7. The viewfinder of claim 1, wherein said support base assembly further comprises a pair of cooperating dovetail slot members extending in a lateral direction relative to the camera for a substantial distance for allowing substantial lateral adjustment of the position of the viewfinder relative to the camera.

8. The viewfinder of claim 7, wherein said pair of cooperating dovetail slot members include a dovetail locking mechanism for selectively locking said dovetail slot members together.

9. The viewfinder of claim 1, wherein said support base assembly further comprises a rod support base having a pair of spaced and parallel bores extending longitudinally of the video camera and slid ably receiving a pair of rods for allowing substantial longitudinal adjustment of the position of the viewfinder relative to the camera.

10. The viewfinder of claim 9, wherein said rod support base includes a rod locking mechanism for selectively locking said pair of rods in a selected position on said rod support base.

11. The viewfinder of claim 2, wherein said outer surface on said viewing module on which said control knobs are positioned is a substantially vertical surface facing away from the camera.

12. The viewfinder of claim 1, wherein said pivot locking mechanism comprises a large diameter threaded ring encircling the pivotal connection between said support base assembly and said pivot member for selectively imposing a substantial frictional force therebetween for preventing relative pivoting.

13. The viewfinder of claim 1, wherein said cooperating and releasable electrical connectors comprise a single mating plug and socket mechanism with a multiplicity of separate electrical contacts in said plug mating with a multiplicity of electrical contacts in said socket.

14. The viewfinder of claim 1, wherein said optical lens system is adjustable for adjustably focusing on said CRT to accommodate the eye of the viewer.

15. The viewfinder of claim 1, further comprising a bayonet locking mechanism releasably connecting said viewing module to said pivot member, said bayonet locking mechanism having a rotatable lock for connecting and disconnecting said viewing module to and from said pivot member without rotating said viewing module relative to said pivot member.

16. The viewfinder of claim 3, further comprising a first bayonet locking mechanism releasably connecting said viewing module to said extension member and a second bayonet locking mechanism releasably connecting said extension member to said pivot member, each said bayonet locking mechanism having a rotatable lock for connecting and disconnecting said bayonet locking mechanism without rotating said viewing module, said extension member and said pivot member.

17. The viewfinder of claim 3, wherein said support base assembly further comprises a pair of cooperating dovetail slot members extending in a lateral direction relative to the camera for a substantial distance for allowing substantial lateral adjustment of the position of the viewfinder relative to the camera.

18. The viewfinder of claim 17, wherein said support base assembly further comprises a rod support base having a pair of spaced and parallel bores extending longitudinally of the camera and slidably receiving a pair of rods for allowing substantial longitudinal adjustment of the position of the viewfinder relative to the camera.

19. The viewfinder of claim 18, further comprising a first bayonet locking mechanism releasably connecting said viewing module to said extension member and a second bayonet locking mechanism releasably connecting said extension member to said pivot member each said bayonet locking mechanism having a rotatable lock for connecting and disconnecting said bayonet locking mechanism without rotating said viewing module, said extension member and said pivot member.

20. The viewfinder of claim 7, wherein said support base assembly further comprises a rod support base having a pair of spaced and parallel bores extending longitudinally of the video camera and slid ably receiving a pair of rods for allowing substantial longitudinal adjustment of the position of the viewfinder relative to the video camera.

21. A viewfinder for mounting on a camera having a video signal tap, comprising:
- a support base assembly for mounting on the camera to extend laterally of the camera;
- a pivot member pivotally connected to said support base assembly for selectively pivoting about a laterally extending axis,
- a pivot locking mechanism on said pivot member and support base assembly for selectively locking said pivot member to said support base to prevent pivoting there between;
- a socket formed in said pivot member, the socket having an electrical connector;
- a viewing module releasably connected to said socket in said pivot member for extending rearwardly along a side of the camera, said viewing module having a CRT facing rearwardly and an eyepiece extending rearwardly for viewing said CRT; and
- an electrical connection from the video signal tap of the camera through said electrical connector to said viewing module for transmitting video signals from the camera to said viewing module;
- wherein the socket rigidly attaches the viewing module to the camera and maintains the viewing module in a fixed relationship to the camera when the socket is either releasably connected directly to the viewing module or releasably connected to the viewing module through a rigid extension module.

22. The viewfinder of claim 21, wherein said viewing module includes CRT controls on an outer surface for manually controlling the CRT.

23. The viewfinder of claim 21, wherein said support base assembly further comprises a pair of cooperating dovetail slot members extending in a lateral direction relative to the video camera far a substantial distance for allowing substantial lateral adjustment of the position of the viewfinder relative to the camera.

24. The viewfinder of claim 23, wherein said support base assembly further comprises a rod support base having a pair of spaced and parallel bores extending longitudinally of the camera and slidably receiving a pair of rods for allowing substantial longitudinal adjustment of the position of the viewfinder relative to the camera.

25. The viewfinder of claim 21, wherein said support base assembly further comprises a rod support base having a pair of spaced and parallel bores extending longitudinally of the camera and slidably receiving a pair of rods for allowing substantial longitudinal adjustment of the position of the viewfinder relative to the camera.

26. The viewfinder of claim 21, further comprising an extension member releasably connected between said pivot member and said viewing module.

27. The viewfinder of 26, wherein said extension member comprises a rigid member of a fixed length.

28. The viewfinder of claim 26, wherein said extension member is comprised of telescoping tubular members with a locking mechanism between said telescoping tubular members.

29. The viewfinder of claim 26, wherein said support base assembly further comprises a pair of cooperating dovetail slot members extending in a lateral direction relative to the camera for a substantial distance for allowing substantial lateral adjustment of the position of the viewfinder relative to the camera.

30. The viewfinder of claim 26, wherein said support base assembly further comprises a rod support base having a pair of spaced and parallel bores extending longitudinally of the camera and slidably receiving a pair of rods for allowing substantial longitudinal adjustment oaf the position of the viewfinder eyepiece relative to the camera.

31. A viewfinder for mounting on a top-front portion of a camera having a video signal tap, comprising:
- a support base assembly for mounting on the top-front portion to extend forwardly and laterally of the camera, said support base assembly having means for allowing substantial longitudinal and lateral adjustment of the viewfinder;
- a pivot member pivotal connected to said support base assembly for selectively pivoting about a laterally extending axis, said pivot member having electrical wires from a connection to the video signal tap of the camera for transmitting video signals from the camera;
- a pivot locking mechanism on said pivot member and support base assembly for selectively locking said pivot member to said support base assembly to prevent pivoting therebetween;
- a viewing module releasably connected to said pivot member for extending rearwardly along a side of the camera, said viewing module having a CRT facing rearwardly and an eyepiece extending rearwardly of said CRT for viewing said CRT, and said viewing module" including controls for operating said CRT positioned on an outer surface of said viewing module;
- a bayonet locking mechanism releasably connecting said viewing module to said pivot member, said bayonet locking mechanism having a rotatable lock for connecting and disconnecting said viewing module to and from said pivot member without rotating said viewing module relative to said pivot member; and
- cooperating and releasable electrical connectors on said pivot member and said viewing module for transmitting video signals and electrical power from said pivot member to said viewing modules.

32. The viewfinder of claim 31, further comprising an extension member releasably connected between said pivot member and said viewing module, said extension member having cooperating and releasable electrical connectors on each end releasably connected to said electrical connectors on said pivot member and said CRT module, respectively, and an electrical cable extending through said extension member and electrically connected to said electrical connectors on each end.

33. The viewfinder of claim 32, wherein said extension member is comprised of telescoping tubular members with a locking means between said telescoping tubular members.

* * * * *